United States Patent Office 2,779,994
Patented Feb. 5, 1957

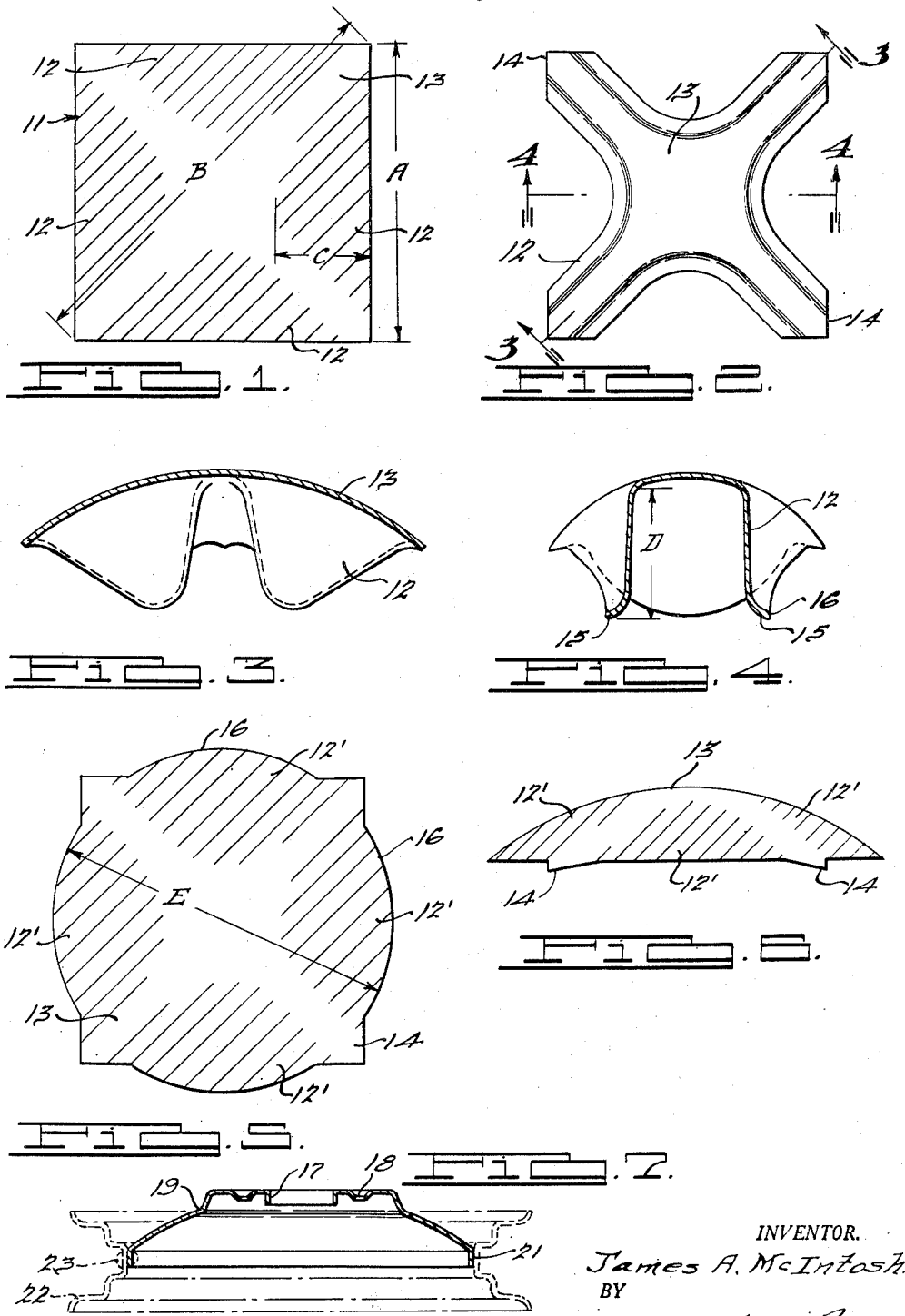

2,779,994

WHEEL DISK AND METHOD OF MANUFACTURE

James A. McIntosh, Detroit, Mich., assignor to McIntosh Stamping Corporation, Detroit, Mich., a corporation of Michigan Application July 6, 1954, Serial No. 441,348

6 Claims. (Cl. 29—159.01)

This invention relates to wheel disks and methods of manufacture thereof, and especially such wheels as are adapted for use with present day automotive vehicles and the like.

It is an object of the present invention to provide a method of forming a wheel disk which results in a substantial saving of metal without decreasing the strength of the wheel or reducing the efficiency and strength of its connection with the wheel rim.

It is another object to provide a method of manufacture of the above nature, which permits a circular wheel disk to be made of a square blank the sides of which are substantially smaller than the final diameter of the disk.

It is also an object to provide a method of manufacturing wheel disks starting from a square flat blank having a diagonal length only slightly greater than the rim diameter, and in which the finished wheel has a continuous annular flange for attachment to the rim.

A further object of the invention is the provision of a wheel manufacturing method having the above characteristics, which permits the retention of the original blank thickness in portions of the finished wheel extending to its outer diameter, thereby enhancing the strength of the wheel.

It is also an object to provide, as an article of manufacture, an improved wheel disk having a continuous annular rim attaching flange and having radially extending portions in the wheel with a constant cross-sectional thickness, thus achieving a wheel construction of high dependability for modern day vehicles.

Other objects, features, and advantages of the present invention will become apparent from the subsequent description, taken in conjunction with the accompanying drawings.

In the drawings:

Figure 1 is a plan view of a square metal blank used in carrying out the novel method of this invention;

Figure 2 is a plan view of the blank after the first step in the method has been completed and showing the four drawn sections of the blank:

Figure 3 is a cross-sectional view taken along the line 3—3 of Figure 2 and showing the dome-like shape of the diagonal undrawn section of the blank;

Figure 4 is a cross-sectional view taken along the line 4—4 of Figure 2 and showing the configuration of the drawn blank sections as well as their increase in length;

Figure 5 is a plan view of the wheel disk after the next step of bending back the drawn sections of the blank has been completed and showing the expanded diameter of the blank;

Figure 6 is an elevational view of the semi-finished article of Figure 5, showing the dome-like shape of the bent-back sections; and Figure 7 is a cross-sectional view of the finished wheel after piercing, trimming and flanging operations have been carried out, showing the disposition of the wheel within a wheel rim.

In carrying out the method of this invention a square flat metallic blank 11 is first formed by any conventional process. The thickness of blank 11 is such as to provide sufficient strength for the proposed wheel installation, bearing in mind that the final wheel disk will have radial portions of the original blank thickness and intermediate portions of thinner cross-section. The length A of each side of the blank is made such that the diagonal B is only slightly larger than the internal diameter of the rim to which the wheel is to be attached. In other words, length A can be substantially smaller than the rim diameter.

As the first step in forming the wheel, the four shaded areas of the flat blank marked 12 in Figure 1 are drawn sharply from the plane of the remainder of the blank, this remainder (the unshaded area marked 13 in Figure 1) being formed into such a configuration that it is included in a dome-shaped surface of revolution. This drawing and shaping operation may be done cold with dies of appropriate shape. The results of this first operation are seen in Figures 2, 3 and 4. As seen in Figure 2, the undrawn section 13 of the blank is slightly reduced in its diagonal lengths between the corners 14, due to the dome shape which this section assumes. Figure 3 shows this dome shape, with section 13 retaining the original thickness of the metal blank.

Sections 12 on the other hand are reduced in thickness as seen in Figure 4. This reduction in thickness is due to the stretching or drawing action of the dies and will vary gradually from the original thickness adjacent section 13 to the thinnest cross section shown in Figure 4. The degree of reduction in thickness will depend on the nature of the drawing and the radii of the corners of the die (not shown) which engage sections 12. The outer portions 15 of sections 12 will not be reduced as much as the intermediate portions of these sections since the outer portions are not as restrained during the drawing operation.

The original radial dimension C of each section 12 will be substantially increased during this drawing operation, the maximum size attained being indicated at D in Figure 4. This increase in the radial dimensions of sections 12 will be due to the drawing and stretching process. The outer edges 16 of sections 12 will of course be contiguous with corners 14, and the increase in radial dimensions will be gradual, achieving a maximum size D at the central portion of each section 12. The drawing process is so controlled that this increase in the radial dimensions of sections 12 will be such as to give the final wheel a sufficiently large diameter, as described in detail below. It should be noted that the invention is not restricted to any particular angular deformation of sections 12 with respect to section 13, although this angular deformation will usually be of a substantial nature as seen in Figure 4.

After the step described above has been completed the drawn and lengthened sections 12 are bent or forced back into alignment with dome-shaped section 13. This step, which may be carried out by conventional die methods, will result in the semi-completed blank shown in Figures 5 and 6. The blank now has a minimum diameter E which is sufficiently large to form a continuous annular flange for attachment to the rim, as described below. This diameter is produced by the increased size of sections 12, marked 12' in Figure 5. The edges 16 of these sections will have a curvature substantially concentric with the wheel center. Section 13 will remain substantially unchanged during this step. It will be noted that corners 14 protrude slightly beyond the diameter of edges 16. The dome-like shape of section 13 is now contiguous with the shape of sections 12' which are dome-like in character as seen in Figure 6. However, section 13 now forms a spoke-like area which is of the original blank thickness, whereas intermediate sections 12' are of thinner cross section.

A piercing and trimming operation is included in the final step or steps of the process. The finished wheel disk is shown in Figure 7, and it will be seen that a flanged central hub-receiving aperture 17 has been formed. Bolt holes 18 are pierced in the wheel surrounding aperture 17 for attachment to the hub, and a suitable shape is formed in the wheel at 19 according to requirements. An annular rim-attaching flange 21 is also formed on the wheel, protruding edges 14 being trimmed away, and the wheel may be attached to rim 22 by rivets 23 or other appropriate means. These various finishing operations on the wheel may be performed in one or more steps as desired.

It should be noted that attaching flange 21 is formed from the stock made available at the marginal edges of the blank by the drawing and bending back of blank sections 12. These steps not only provide a continuous annular area of sufficiently large diameter for attachment to the rim, but also provide a wheel disk having spaced radial areas of the original blank thickness. Moreover, due to the limited reduction in cross section of outer portions 15, rim 21 will be of sufficient thickness for secure attachment to rim 22 by conventional means. The wheel disk is manufactured from a blank substantially smaller than is normally required and is produced with an absolute minimum of waste material.

While it will be apparent that the preferred embodiment of the invention herein disclosed is well calculated to fulfil the objects above stated, it will be appreciated that the invention is susceptible to modification, variation and change without departing from the proper scope or fair meaning of the subjoined claims. For example, the invention is contemplated to include forming a flat wheel disk instead of a dome-shaped disk by leaving section 13 in a flat plane and bending back sections 12 into this flat plane after they are drawn. Other and similar modifications could be made.

What is claimed is:

1. A method of manufacturing a wheel disk comprising the steps of forming a square blank having a diagonal length slightly larger than the required final diameter of the disk, drawing out four separate sections of the blank which extend inwardly from the sides thereof, whereby the areas of the drawn sections are increased in a direction away from the blank center, the undrawn portions of the blank forming a cross-shaped section between the drawn sections, bending back said drawn sections into alignment with said undrawn section and forming a continuous annular rim of said required diameter on the blank.

2. In a method for forming a wheel disk, the steps of forming a square blank having a diagonal length slightly larger than the required final disk diameter, drawing four sections of said blank from the plane thereof, said sections being of roughly triangular shape and extending inwardly from the sides of said blanks, whereby the undrawn portions of said blank form a cross-shaped section between said drawn sections and extending to the corners of said blank, the drawing action being such as to reduce the cross-sectional thickness of said drawn sections and to extend the outer edges thereof into a curved shape away from the blank center, forcing said drawn sections back into alignment with said undrawn section whereby the outer edge portions of said drawn sections together form a substantially circular edge on said blank, and forming a continuous annular flange of said required diameter on said outer edge portions.

3. In a method for forming a wheel, the steps of providing a square flat blank having a diagonal length slightly larger than the required final wheel diameter, forming a cross-shaped section of said blank extending to the corners thereof into such a configuration that it is included in a dome-shaped surface of revolution, drawing four sections of said blank from said first section, said four sections being of roughly triangular shape and extending inwardly from the side edges of the blank, the drawing process being such that the drawn sections are reduced in cross-sectional thickness and increased in area, said side edges being forced away from the blank center into an arcuate shape, bending said drawn sections back into alignment with said first-mentioned section to form a blank of roughly circular shape, and forming a continuous annular flange of the required diameter on said circular marginal blank edge.

4. In a method for forming a wheel disk, the steps of forming a square blank having a diagonal length slightly larger than the required final disk diameter, drawing four sections of said blank from the plane thereof, said sections being of approximately triangular shape and extending inwardly from the sides of said blank, whereby the undrawn portions of said blank form a cross-shaped section between said drawn sections and extending to the corners of said blank, the drawing action being such as to reduce the cross-sectional thickness of said drawn sections and to stretch the outer edges thereof into a curved shape away from the blank center, forcing said drawn sections back into alignment with said undrawn section whereby the outer edge portions of said drawn sections together form a substantially circular edge on said blank, trimming the protruding corners of said blank, and forming a continuous annular flange of the required diameter on said outer edge portions.

5. In a method for forming a wheel disk, the steps of providing a square flat blank having a diagonal length slightly larger than the required final disk diameter, forming a cross-shaped section of said blank extending to the corners thereof into such a configuration that it is included in a dome-shaped surface of revolution, drawing four sections of said blank from said first section, said four sections being of roughly triangular shape and extending inwardly from the side edges of the blank, said drawing process being such that the drawn sections are reduced in cross-sectional thickness and said side edges are extended away from the blank center into an arcuate shape, forcing said drawn sections back into alignment with said first-mentioned section to form a blank of roughly circular shape, trimming the protruding corners of said blank, and forming a continuous annular flange of said required diameter on the circular marginal blank edge.

6. In a method for forming a wheel disk, the steps of providing a square flat blank having a diagonal length slightly larger than the required final disk diameter, forming a cross-shaped section of said blank extending to the corners thereof into such a configuration that it is included in a dome-shaped surface of revolution, drawing four sections of said blank from said first section, said four sections being of roughly triangular shape and extending inwardly from the side edges of the blank, said drawing process being such that the drawn sections are reduced in cross-sectional thickness and said side edges are extended away from the blank center into an arcuate shape, forcing said drawn sections back into alignment with said first-mentioned section to form a blank of roughly circular shape, forming a central hub aperture and surrounding bolt holes in said blank, and forming a continuous annular flange of said required diameter on the circular marginal blank edge.

References Cited in the file of this patent

UNITED STATES PATENTS

| | | |
|---|---|---|
| 1,483,654 | Eschwig | Feb. 12, 1924 |
| 1,865,185 | Greenwald | June 28, 1932 |
| 1,931,152 | Mueller | Oct. 17, 1933 |
| 2,088,265 | Hulin et al. | July 27, 1937 |